United States Patent [19]

Moon et al.

[11] Patent Number: 4,886,778

[45] Date of Patent: Dec. 12, 1989

[54] SUPERCONDUCTING ROTATING ASSEMBLY

[75] Inventors: Francis C. Moon; Rishi Raj, both of Ithaca, N.Y.

[73] Assignee: Cornell Research Foundation Inc., Ithaca, N.Y.

[21] Appl. No.: 227,066

[22] Filed: Aug. 1, 1988

[51] Int. Cl.$^4$ ............................................. F16C 39/06
[52] U.S. Cl. .......................................... 505/1; 310/52; 310/90.5; 335/216; 505/700
[58] Field of Search .................... 310/90.5, 40, 10, 52, 310/54, 59; 335/216; 505/1, 700; 336/DIG. 1

[56] References Cited

U.S. PATENT DOCUMENTS

| | | | |
|---|---|---|---|
| 3,026,151 | 3/1962 | Buchhold. | |
| 3,175,405 | 3/1965 | Doyle et al. | 310/90.5 |
| 3,261,210 | 7/1966 | Buchhold | 310/90.5 |
| 3,327,265 | 6/1967 | Van Geuns et al. | |
| 3,422,765 | 1/1969 | Schoch. | |
| 3,493,274 | 2/1970 | Emslie et al. | |
| 3,629,753 | 12/1971 | Kawabe et al. | |
| 3,820,859 | 6/1974 | Brown. | |
| 4,040,681 | 8/1977 | van der Heide. | |
| 4,471,331 | 9/1984 | Wyatt. | |
| 4,797,386 | 1/1989 | Gyorgy et al. | 310/90.5 |

OTHER PUBLICATIONS

"Superconductivity: Facts vs. Fancy", K. Fitzgerald; 5/1988; pp. 30–41; IEEE Spectrum.
"Superconductor World Report"; vol. 1/No. 1; Dec., 1987 (1 page).
"Levitation of a Magnet Over a Flat Type II Superconductor", F. Hellman, et al., J. Appl. Phys., vol. 63, No. 2, pp. 447–450; 11/15/88.
"Magnetic and Electric Suspensions", P. J. Geary, British Scientific Instrument Research Association, No. 6, pp. 1–161, 1964.

Primary Examiner—R. Skudy
Attorney, Agent, or Firm—Perman & Green

[57] ABSTRACT

A non-contacting superconducting rotating assembly is described which includes a floating, unsupported and stable rotor. The assembly includes first and second bearings comprised of a material which exhibits Type II superconducting properties. The rotor includes a magnetic pole at each of its extremities, each pole resting in a bearing. The polar axis of each pole is colinear with the rotating axis of the rotor. A temperature bath is provided for maintaining the bearings at or below their critical superconducting temperature and a motive mechanism provides for rotation of the rotor. Each magnet pole is thereby levitated and adapted to rotate in a stable, non-contacting position by the field and pinning effects generated by the associated bearing.

6 Claims, 4 Drawing Sheets

2 COIL DRIVE

CURRENT = cos wt

3 COIL DRIVE

EACH COIL 120° OUT OF PHASE WITH THE OTHER

4 COIL DRIVE

EACH COIL 90° OUT OF PHASE WITH THE OTHERS — TO CREATE A ROTATING FIELD

SUPERCONDUCTING ROTATING ASSEMBLY

FIELD OF THE INVENTION

This invention relates to superconducting rotating devices and, more particularly, to superconducting bearings which employ Type II superconductors. The U.S. Government has a non-exclusive license right to this invention as a result of partial support thereof by a grant from the National Science Foundation.

BACKGROUND OF THE INVENTION

Conventional bearings for high speed rotating devices are know to be subject to wear, noise, vibration and thermal problems. Until recently, practical magnetic bearings have been of either the permanent magnet or the electromagnet feedback type. Permanent magnet bearings are subject to inherent static instabilities and must be stabilized in at least one degree of freedom by non-magnetic means (e.g. a rotatable coupling). Feedback—based magnetic bearings often require elaborate position sensors and electronics to achieve stability.

The prior art has attempted to improve the magnetic bearing art by turning to superconductivity. In such instances, either the bearing member or the rotating member or both are maintained in a Type I superconducting state so as to achieve a magnetic pressure therebetween and thereby provide a desired degree of levitation. Type I superconductors exhibit perfect diamagnetism up to a critical applied field, at which point superconductivity is lost and the magnetization of the sample rises abruptly. Examples of superconducting bearings of the Type I kind can be found in U.S. Pat. Nos. 3,493,274 to Emslie et al and 3,026,151 to Buchhold. In order to obtain stability in those systems, the bearing structures generally rely on either a mechanical rotary support (e.g. Buchhold) or employ dished or other encompassing type superconductors whereby the shape provides a gravitational minimum which leads to limited lateral stability (see Emslie et al).

Recently, others have discovered new ceramic compositions which exhibit superconducting properties at temperatures in excess of liquid nitrogen. These new superconductors are generally Type II materials with upper critical fields typically greater than 30–35 Teslas. A Type I superconductor may be said to "screen out" magnetic flux from its interior. By contrast, a Type II superconductor enables magnetic flux to penetrate into its interior in clusters of flux lines. Under such circumstances, circulating superconducting currents are established within the Type II superconductor. They, in turn, generate substantial magnetic fields and exert a positional pinning effect on a magnet levitated over the surface of the superconductor.

A benefit to be potentially gained from a levitated superconducting bearing is its ability to achieve rotational speeds of 10's of thousands of rpm. In order to attain such speeds, teachings of the prior art which suggest immersion of the entire unit in a liquid helium/nitrogen environment are impractical. Prior art teachings that call for exquisitely balanced rotors with "hard suspensions" are also to be avoided if possible. Furthermore, external rotational stabilization is to be avoided, if at all possible.

Accordingly, it is an object of this invention to provide a superconducting rotating assembly which exhibits levitated lateral, vertical and axial stability while enabling rotation at high speed.

It is another object of this invention to provide a superconducting rotating assembly of simple and inexpensive design which is adapted for high speed, stable rotation.

It is a further object of this invention to provide a superconducting rotating assembly which employs a soft suspension for accommodating rotors with significant imbalance.

SUMMARY OF THE INVENTION

In accordance with the above objects, a non-contacting, soft suspension, superconducting rotating assembly is disclosed which includes a floating, unsupported and stable rotatable member. The assembly includes first and second opposed, suitably shaped bearing means comprised of a material which exhibits Type II superconducting properties. The rotatable member includes magnet means at each extremity which rest in the opposed bearing means. The axis connecting the north and south poles of each such magnet means is colinear with the rotating axis of the rotatable member. Means are provided for maintaining the bearing means at or below the critical superconducting temperature and means are additionally provided for rotating the rotatable member. Each magnet means is thereby levitated and adapted to rotate in a stable, non-contacting position by the field and pinning effects generated by the associated bearing means.

DETAILED DESCRIPTION OF THE INVENTION

Figure 1:
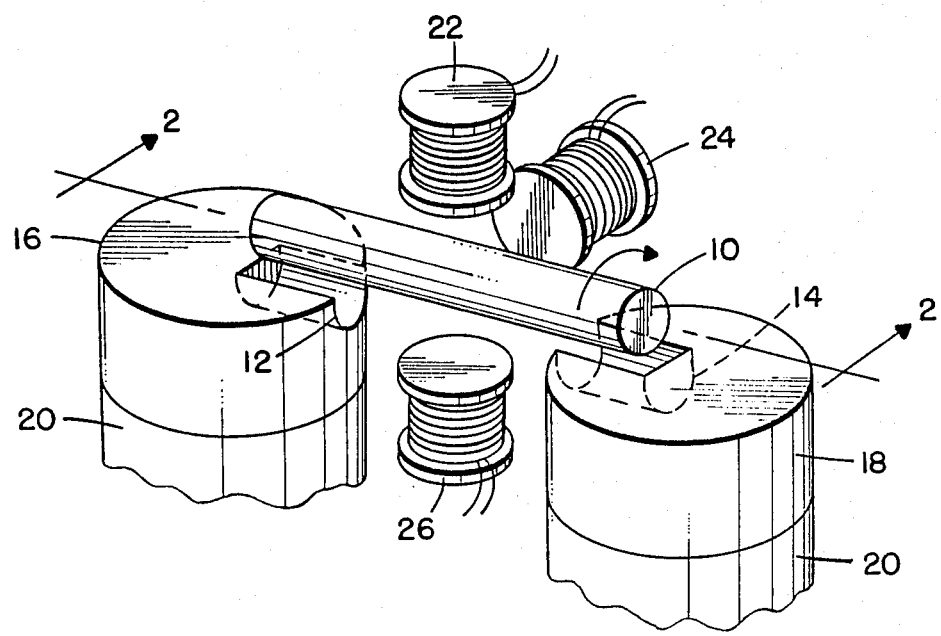
FIG. 1 is an isometric view of the invention.

Referring to FIG. 1, a rotor 10 fits within recesses 12 and 14 in bearing blocks 16 and 18 respectively. Each of bearing blocks 16 and 18 is mounted on a copper or aluminum pedestal 20 which is, in turn, immersed in a supercold liquid such as liquid nitrogen. Four coils (of which one is not shown) 22, 24 and 26, provide the motive force to cause rotation of rotor 10.

Each of bearing blocks 16 and 18 is comprised of a material which exhibits Type II superconducting properties when it is maintained at a temperature less than its critical temperature. A preferred material for bearing blocks 16 and 18 is the ceramic compound $YBa_2Cu_3O_x$. Other Thallium, Bismuth or other ceramic based compounds which exhibit Type II superconducting properties are also acceptable. An appropriate material for pedestals 20 is a 60/63 alloy of aluminum.

Figure 2:
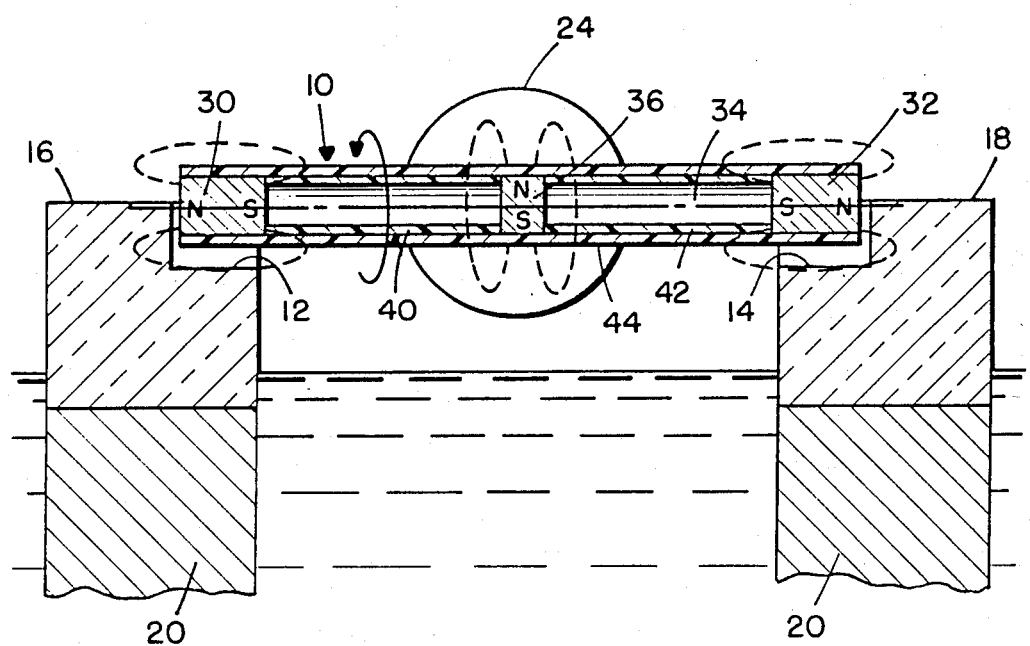
FIG. 2 is a section view of the invention taken along the line 2—2 shown in FIG. 1.

Referring now to FIG. 2, rotor 10 is shown in section and includes two levitating magnets 30 and 32 which are preferably cylindrical in shape and have their north-/south polar axes aligned with centerline 34 of rotor 10. A third magnet 36 has its polar axis oriented orthogonally to centerline 34 and generates a field to enable rotor 10 to be rotated by field coils 22, 24 and 26 etc. Magnets 30 and 32 are mounted in and maintained in position by hollow cylinders 40 and 42 in combination with elongated cylinder 44. Cylinders 40, 42 and 44 may be comprised of any suitable non-magnetic material which provides sufficient stiffness to enable rotor 10 to maintain dimensional stability as it rotates at high speed. Polycarbonates and other similar polymeric materials are suitable. Magnets 30 and 32 are preferably comprised of samarium cobalt and exhibit a linear dipole as shown in FIG. 2. Other rare earth magnets are also acceptable (for instance Nd, B, Fe based magnets). Magnet 36 may also be comprised of a similar rare earth material or of some other suitable permanent magnet material. While it is desirable to make rotor 10 as balanced as possible about its centerline, no special balancing is required for high speed operation, due in the main to the "soft suspension" created by bearing blocks 16 and 18. In other words, some "wobble" is accommodated by the suspension without detriment to the system.

Figure 3:
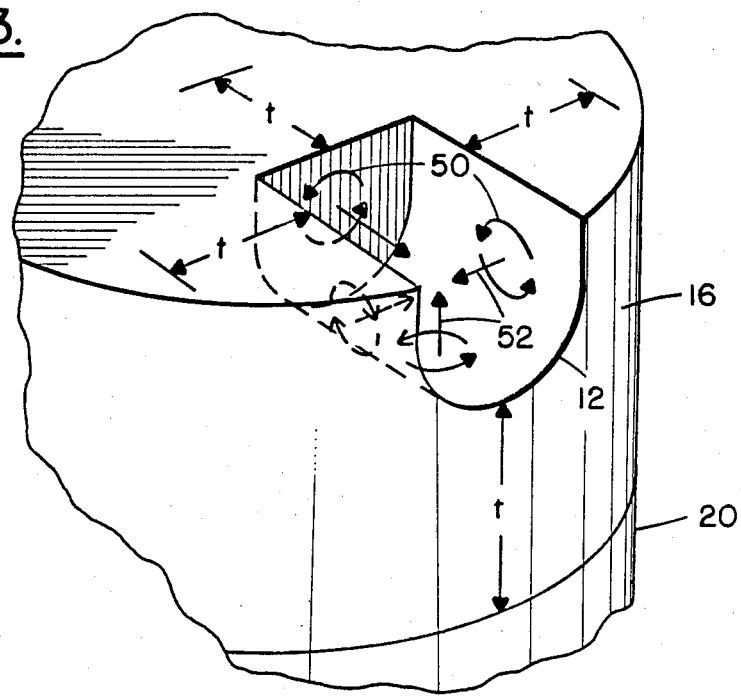
FIG. 3 is an enlarged isometric of the Type II superconducting bearing shown in FIG. 1.

Referring now to FIGS. 2 and 3 in conjunction, and further assuming that the assembly shown in FIG. 2 is at a superconducting temperature, the placement of rotor 10 in bearing recesses 12 and 14 causes induced supercurrents in the wall areas of the bearing recesses. It should be noted that the bearing recesses 12 and 14 do not totally enclose the circumference of the respective ends of the rotor 10. The supercurrents are shown by arrows 50 and create electromagnetic repulsion forces illustrated by arrows 52. Those forces act to elevate and pin magnets 30 and 32 to a stable levitated position. The horizontal, side and end walls of each bearing recess, in combination, enable the electromagnetic pinning forces to exert a stabilizing effect on its associated rotor magnet. Importantly, the internal surfaces of each bearing recess see no change in the polarity of flux as rotation of rotor 10 occurs. This is important as it avoids the imposition of displacement torques on the rotating magnets which would tend to cause rotor 10 to become unstable. In other words, if, during rotation, recess 12 experienced subsequent north and south poles during the rotation of rotor 10, the resulting torques exerted by the interfering fields would prevent the system from obtaining the desired high rotational speeds.

Figure 4:
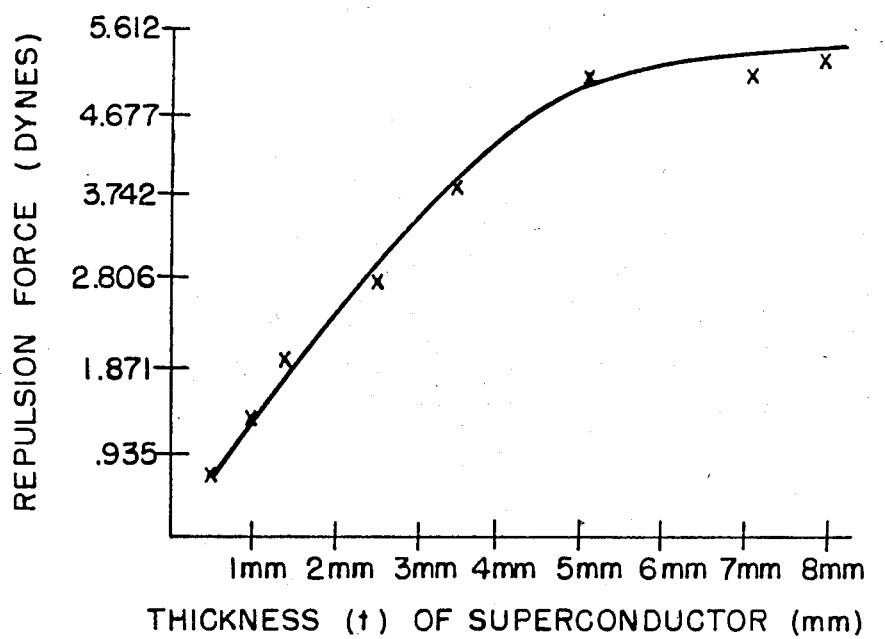
FIG. 4 is a plot of the variations in repulsive force with thickness for a Type II superconducting bearing.

As can be seen from an examination of FIG. 4, the repulsive force exerted by Type II superconducting materials has been found to be a mass-related phenomenon. Thus, as the thickness of superconductor adjacent to each bearing recess is increased, so also does the repulsion force it exerts on a magnet which is bought into proximity. However, it can be seen from the curve that at approximately 5 mm or greater thickness, there is no further substantial increase in the repulsive force. Thus, it is preferable that the thickness (t) surrounding the bearing recesses be at least 5 mm so as to assure the maximum repulsive force on rotor 10. This enables the mass of rotor 10 to be maximized.

While not shown in the drawings, in normal use, rotor 10 may have mounted thereon any number of different types of components. For example, it may have mounted thereon a multifaceted mirror which may be used in conjunction with a laser beam to scan an appropriate target; it may further have mounted thereon a small disk particularly adapted to optical data storage etc.

The provision of conductive pedestals 20 to support bearing blocks 16 and 18 enables the level of the superconducting fluid to be kept substantially away from the rotating member. Thus, the rotating member and upper portions of bearing blocks 16 and 18 may be mounted in a vacuum to enable ultra-high rotating speeds. It has been found that bearings blocks 16 and 18 will obtain Type II superconducting properties when pedestals 20 are immersed in liquid nitrogen, even when such immersion occurs at a substantial distance from the bearing blocks.

Figure 5:
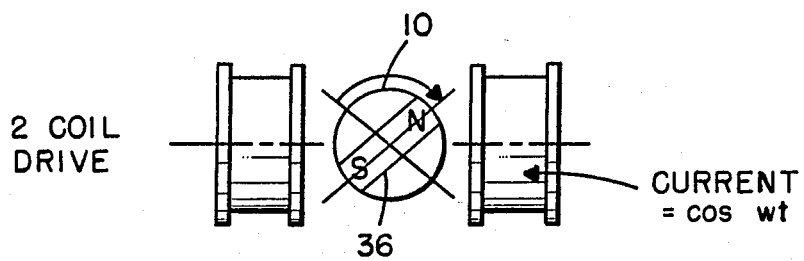
FIG. 5 illustrates a two coil drive for the superconducting rotating assembly.
Figure 6:
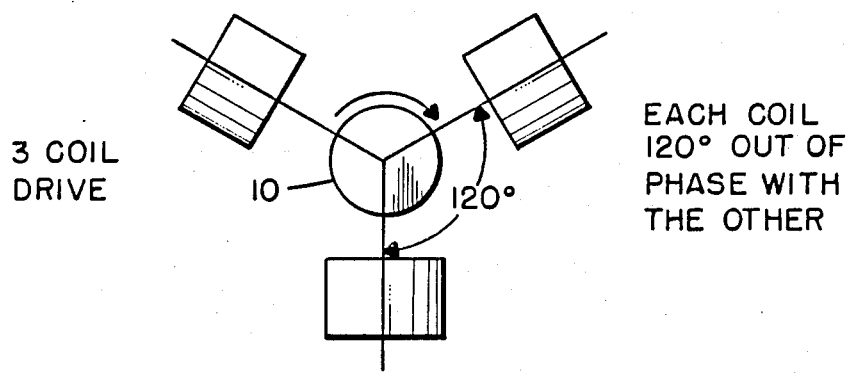
FIG. 6 illustrates a three coil drive for the superconducting rotating assembly.
Figure 7:
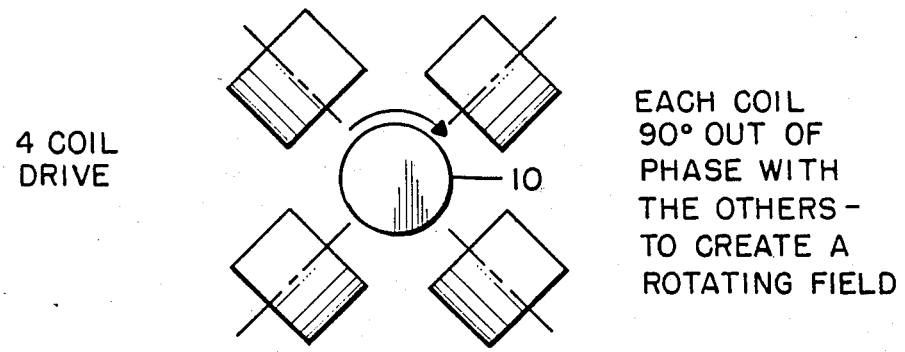
FIG. 7 illustrates a four coil drive for the superconducting rotating assembly.

Referring now to FIGS. 5-7, shown therein are schematic diagrams of systems for imparting rotational motion to rotor 10. In FIG. 5, a two coil system is shown wherein magnet 36 is caused to rotate by the imposition of an ac current in the two coils, with the phase in one coil being related to the other by a cosine function. In FIG. 6, a three coil drive system is shown wherein the coils are placed at 120° intervals and are driven 120° out of phase with each other. In FIG. 7, a four coil drive is shown with each coil being driven 90° out of phase with the other to create a rotating field which again imparts rotational movement to rotor 10. While each of the above rotational systems involves the use of electromagnetic energy, rotor 10 could also be rotated through the use of a high pressure gas jet pointed at a circumferential portion of rotor 10 which has been serrated or has emplaced thereon, turbine blades.

Figure 8A:
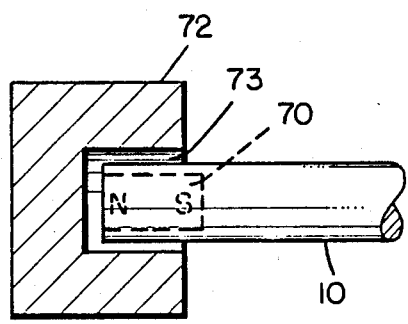
FIGS. 8(a), 8(b) and 8(c) illustrate a first alternative bearing configuration for the invention.
Figure 8C:
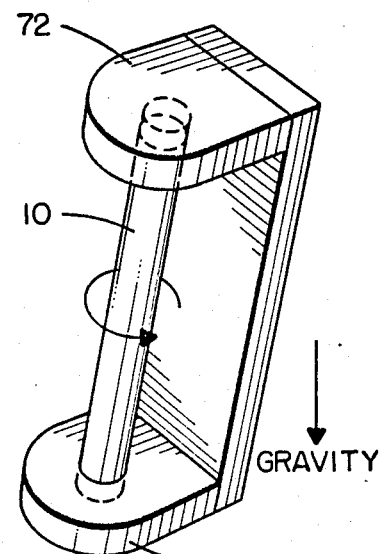
Figure 8B:
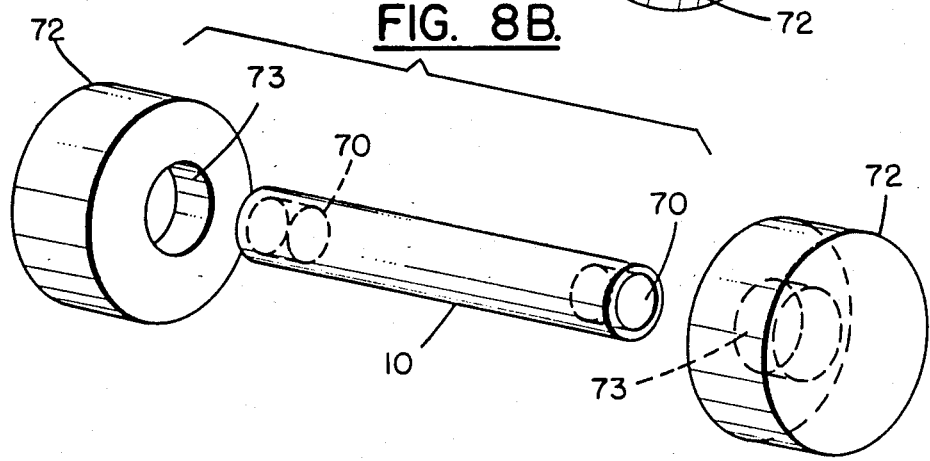
Figure 9A:
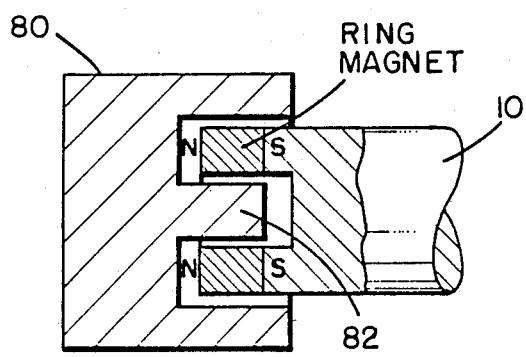
FIGS. 9(a) and 9(b) illustrate second and third alternative bearing configurations for the invention.
Figure 9B:
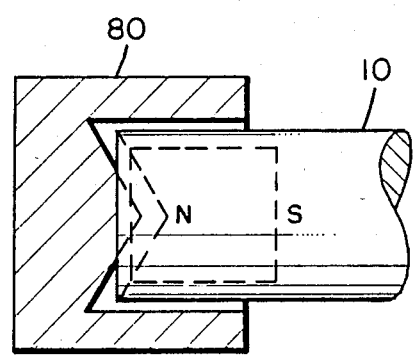

Referring now to FIGS. 8(a), 8(b) and 8(c), a circular Type II superconducting bearing structure 72 is illustrated which includes an orifice 73 enclosing each extremity of rotor 10. As with the system shown in FIG. 1, rotor 10 includes magnets 70 at each of its extremities. In this configuration, the rotor/bearing assembly can be operated in any orientation with respect to gravity (e.g. see FIG. 8(c)). In FIGS. 9(a) and 9(b), further alternative bearing embodiments are shown. In FIG. 9(a), magnets 70 have been replaced by ring magnets which encircles a pedestal 82 emanating from the center of bearing block 80. In FIG. 9(b), each of magnets 70 is replaced by a magnet with a concave indentation which mates with a conical pedestal emanating from bearing block 80.

EXAMPLE

Several pairs of $YBa_2Cu_3O_x$ bearing blocks, 1.5 cm in diameter were made by a sintering process at 950° C. in air. The crystals were randomly oriented and the specimen required a post anneal treatment in pressurized oxygen (20 bars) at 800° C. for 2 hours in order to obtain a Tc greater than 90° Kelvin.

Some of the bearing blocks were shaped as shown in FIGS. 1-3. Using a Hall effect probe, normal flux density measurements could be made on the surface of the superconductor underneath a levitated permanent magnet. When the permanent magnet dipole was parallel to the ceramic bearing surface, normal flux surface measurements were of the order of 0.07 Tesla. The sign of the normal flow indicated that two superconducting eddy current vortices were active in the superconductor, one near each of the two magnets' poles. The surface field measurement also indicated that incomplete flux exclusion was in effect during levitation which is typical of Type II superconductors.

There was considerable hysteretic behavior in the levitation level of the rotor. For small perturbation forces, the levitated rotor exhibited lateral and vertical stiffness. The rotor was spun by a magnetic field created by nearby coils. No discernible effect by the alternating field on the superconductor or the levitation height was observed with and without rotation. At low frequencies, however (1-4 Hz), periodic magnetic forces excited the magnetic stiffness modes through a resonance which sometimes evicted the rotor off the superconducting bearing pads. At higher frequencies, lock-in of the rotor speed and driving field frequency occurred and permitted increase of the rotor speed to over 12,000 rpm. The low frequency instability was readily overcome by rapidly moving the rotor through the resonant frequencies by substantial application of the energizing field. It is surmised that flux pinning creates the hysteretic effects of the magnetic forces on the rotor. Nevertheless, the rotor once in position maintains a stable position, unless pushed out of it by an external force.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

We claim:

1. A non-contacting, soft suspension, superconductive, rotating assembly comprising:
   first and second bearing means comprised of material exhibiting Type II superconducting properties, each said bearing means formed as a recess in said superconducting material, said material not totally enclosing a portion of the circumference of an extremity of a member placed therein;
   a rotatable member having two extremities aligned along a common axis, each extremity associated with a bearing means;
   magnet means at each extremity, each magnet means having a polar axis which is colinear with said common axis of said rotatable member, each magnet means thereby presenting a single poleface to a bearing means;
   means for maintaining each said bearing means at a temperature where said Type II superconducting properties are manifest; and
   means for rotating said rotatable member, whereby each said magnet means is levitated and is adapted to rotate in a stable non-contacting position by repulsive fields generated by said associated bearing means.

2. The invention as defined in claim 1, wherein said rotating means further includes additional magnet means mounted within said rotatable member; and coil means positioned thereabout to interact with said additional magnet means to cause said rotatable member to rotate.

3. The invention as defined in claim 1, wherein each said bearing means comprises a semi-cylindrical, open ended recess, each said recess adapted to receive an extremity of said rotatable member, the extremities of said rotatable member being cylindrically shaped.

4. The invention of claim 3, wherein said maintaining means includes conductive pedestal means coupled to said bearing means for providing a thermal pathway to cool said bearing means to superconducting temperatures.

5. The invention as recited in claim 3, wherein the material comprising said bearing means is at least 5 mm in thickness about said recess.

6. The invention as defined in claim 5, wherein said rotating means further includes additional magnet means mounted within said rotatable member; and coil means positioned thereabout to interact with said additional magnet means to cause said rotatable member to rotate.

* * * * *